United States Patent [19]
Letwin

[11] Patent Number: 5,027,273
[45] Date of Patent: Jun. 25, 1991

[54] METHOD AND OPERATING SYSTEM FOR EXECUTING PROGRAMS IN A MULTI-MODE MICROPROCESSOR

[75] Inventor: James Letwin, Kirkland, Wash.

[73] Assignee: Microsoft Corporation, Redmond, Wash.

[21] Appl. No.: 341,567

[22] Filed: Apr. 21, 1989

Related U.S. Application Data

[62] Division of Ser. No. 64,117, Jun. 18, 1987, Pat. No. 4,825,358, which is a division of Ser. No. 722,052, Apr. 10, 1985, Pat. No. 4,779,187.

[51] Int. Cl.⁵ ............................................. G06F 12/06
[52] U.S. Cl. ................................. 364/200; 364/232.9; 364/254.8; 364/255.5
[58] Field of Search ............................... 364/200, 900

[56] References Cited

U.S. PATENT DOCUMENTS

| | | | |
|---|---|---|---|
| 3,725,874 | 4/1973 | Van Heel | 364/200 |
| 3,900,834 | 8/1975 | Casey et al. | 364/200 |
| 3,914,747 | 10/1975 | Barnes et al. | 364/200 |
| 3,949,378 | 4/1976 | Crabb et al. | 364/200 |
| 4,128,875 | 12/1978 | Thurber et al. | 364/200 |
| 4,385,352 | 5/1983 | Bienvenu | 364/200 |
| 4,466,056 | 8/1984 | Tanahashi | 364/200 |

*Primary Examiner*—Michael R. Fleming
*Assistant Examiner*—Debra A. Chun
*Attorney, Agent, or Firm*—Seed and Berry

[57] ABSTRACT

Improved methods and operating systems for use with a multi-mode microprocessor enable efficient operation in a multi-mode environment. Preferred embodiments for use with microprocessors which were not designed to switch from each mode to another mode enable multi-tasking of a mixture of programs written for different modes using the mode switching methods of the present invention. Frequently used portions of the operating system are stored in memory at locations which can be commonly addressed in all modes. Means for handling device drivers and interrupts in all modes are also provided. Preferred embodiments for use with computer systems using microprocessors such as the Intel 80286 include means for storing the operating system routines to maximize performance of the system in real mode. Auxiliary protection hardware and I/O masking hardware are also provided in alternate preferred embodiments to enhance protection during real mode operation of such systems. Means for handling interrupts in a mode switching environment and alternate embodiments to eliminate problems caused by hooking programs in a multi-tasking environment are also provided.

21 Claims, 11 Drawing Sheets

FIG. 1
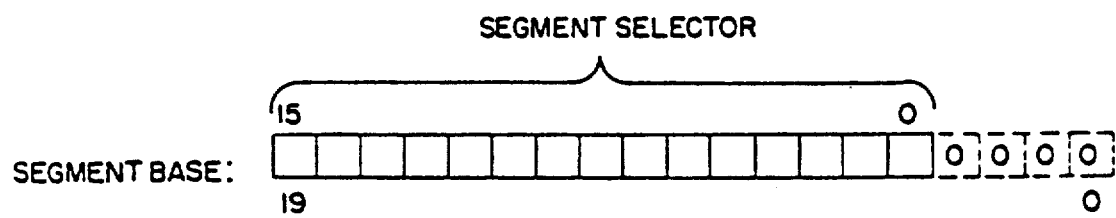
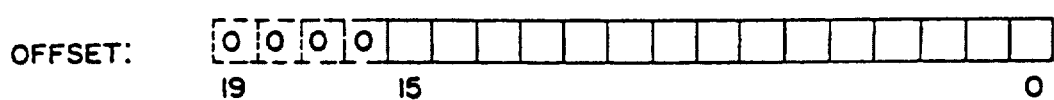
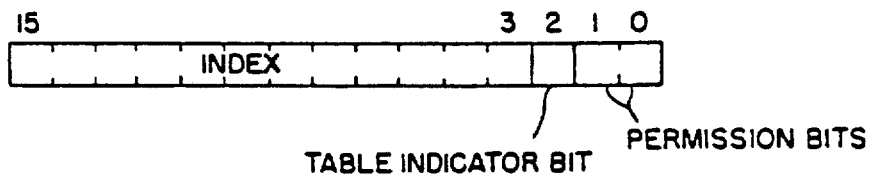
FIG. 2

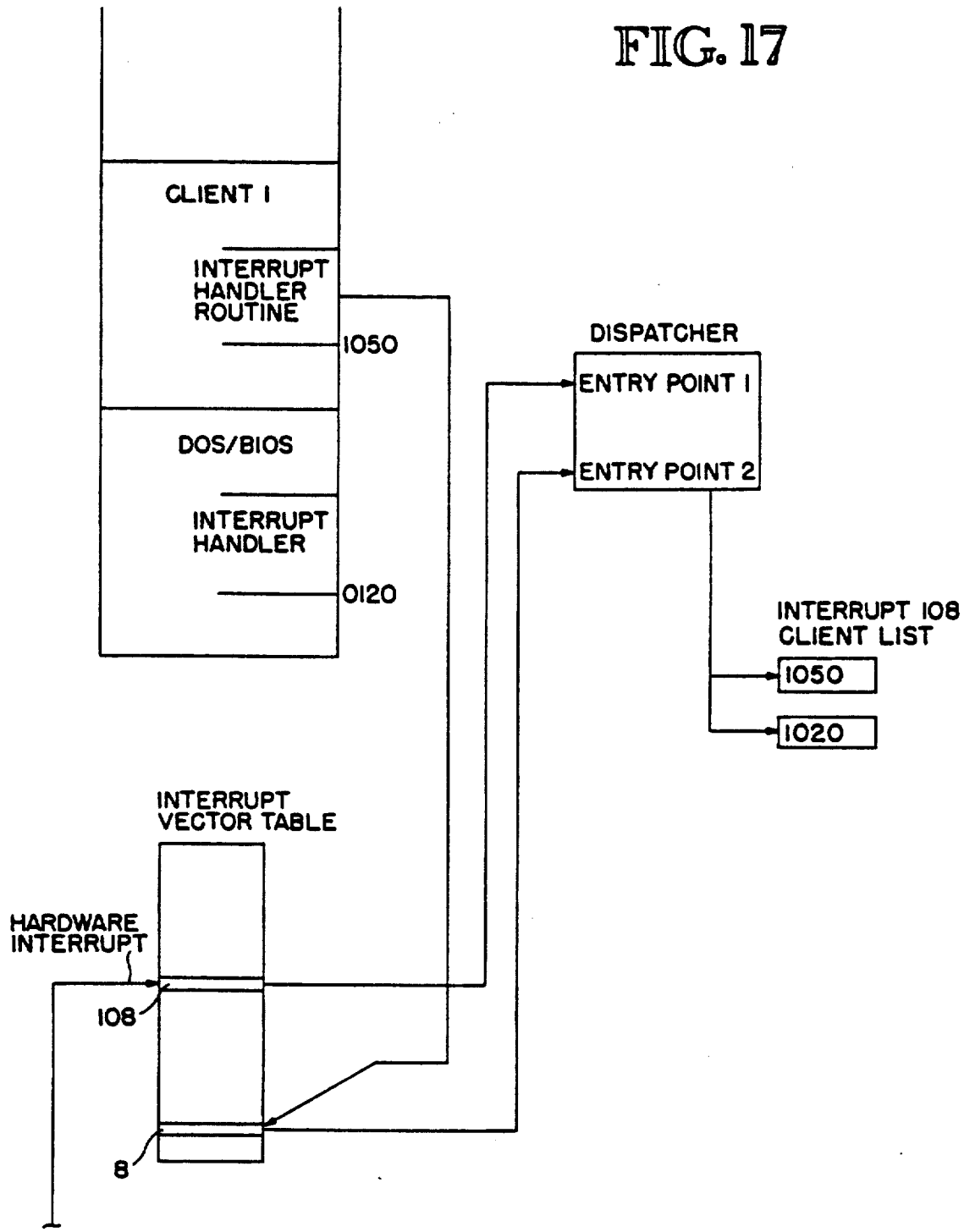

METHOD AND OPERATING SYSTEM FOR EXECUTING PROGRAMS IN A MULTI-MODE MICROPROCESSOR

This application is a division of U.S. patent application Ser. No. 064,117, filed June 18, 1987, now U.S. Pat. No. 4,825,358, which is a division of Ser. No. 722,052 filed Apr. 10, 1985, now U.S. Pat. No. 4,779,187.

TECHNICAL FIELD

This invention relates to improved methods of executing computer programs in a multi-mode microprocessor and improved operating systems for use with such microprocessors.

BACKGROUND ART

Newly designed microprocessors may include enlarged memory addressing facilities and revised architecture which result in enhanced capabilities. When such microprocessors are used in new computer systems, they often produce computers which are functionally superior to their predecessors due to these enhanced capabilities. Despite any functional advantages a new computer may have over its predecessors, a computer employing an improved microprocessor may not be a commercial success. Computer programs, sometimes referred to as "software," are microprocessor specific. Therefore, when a computer employing a new microprocessor is introduced into the marketplace, there is generally little or no software which can run on it. Existing software, written for previous microprocessors, is incompatible with the new computer. As a result, sales of such new computers will often be sluggish until consumers see that adequate software is available for the computer. Additionally, consumers with libraries of software for existing computers may be reluctant to purchase new computers which would require them to invest in all new software. This problem is often compounded by the fact that software writers and publishers are reluctant to produce software for a new microprocessor until sales of computers incorporating the microprocessor are sufficient to create a relatively large group of potential purchasers of the software. This "wait and see" attitude on the part of both consumers and software writers can jeopardize the success of a new microprocessor and computers using the microprocessor.

Designers of new microprocessors sometimes attempt to solve this problem by designing a new microprocessor such that it will operate in two modes. In a first mode, the microprocessor will emulate a prior microprocessor and run existing programs written for the prior microprocessor. In a second mode, the microprocessor will make full use of its enhanced capabilities. Such a design will enable manufacturers of computer systems using the microprocessor to advertise that the entire body of existing programs written for the prior microprocessor will run on their computer, thereby (in theory) stimulating computer sales to a point where software writers will begin to write programs designed to run in the new enhanced mode.

One such microprocessor is the Intel 80286, which is manufactured by the Intel Corporation of Santa Clara, Calif. The design and operation of the Intel 80286 is described in detail in a publication entitled "iAPX 286 Programmer's Reference Manual Including the iAPX 286 Numeric Supplement," which is available from the Intel Corporation and is hereby incorporated by reference.

The Intel 80286 (hereinafter "80286") operates in two modes. In a first mode, called the "real mode," the 80286 emulates the architecture of Intel's previous 8086, 8088 microprocessor family, which is used in the IBM PC and compatible computers, for example. Thus, computers which incorporate the 80286 microprocessor, such as the IBM PC/AT, can run existing 8086 programs written for the IBM PC and compatible computers.

In a second mode, called the "protected mode," the 80286 architecture provides enlarged memory addressing capability, enhanced multi-tasking support features, and a sophisticated protection scheme.

Although the real mode will run existing 8086 programs, there are limitations associated with the real mode. First, it limits the amount of physical memory which can be addressed to 1 megabyte. (In some computers, such as the IBM AT, the amount of physical memory available for programs has been further reduced to 640K.) Second, the real mode does not provide memory relocation, a desirable feature for multi-tasking. Third, the real mode provides no memory protection scheme, a feature needed for multi-tasking and network environments where user or task interference could be devastating.

Because of the limitations of the real mode, the 80286 was not designed to allow frequent switching from one mode to the other. The 80286 is initialized in the real mode and can be switched to the protected mode by means of an instruction provided by the 80286. No method or instruction is provided by the 80286 to switch from protected mode to real mode. To return to real mode from protected mode, it is necessary to reset the microprocessor. Thus, the designers of the 80286 contemplated that it would be used in one mode or the other, with real mode operation being kept separate from the protected mode operation, thereby isolating protected mode programs from the unprotected environment of the real mode.

Unfortunately, such isolation is undesirable from an efficiency standpoint. For efficient operation, the operating system, or "DOS", of a microcomputer incorporating the 80286 should be able to run a mixture of real and protected mode programs in a multi-tasking environment.

DISCLOSURE OF THE INVENTION

It is an object of the present invention to provide improved methods of operating a multi-mode microprocessor that will enable a mixture of programs designed to run in the various modes of the microprocessor to be efficiently executed in a multi-tasking environment.

It is another object of the present invention to provide such methods that will, in alternate preferred embodiments, maximize the capabilities of the individual operating modes.

It is another object of the present invention to provide such methods that will only require the addition of minimal hardware to existing systems.

It is another object of this invention to provide an improved operating system for computers using multi-mode microprocessors.

It is another object of the present invention to provide, in alternate preferred embodiments, an improved system design for use with multi-mode microprocessors having a protected mode and an unprotected mode that will provide enhanced protection when operating in the unprotected mode.

It is another object of this invention to provide preferred embodiments of such methods which will enhance the multi-tasking capability of microprocessors such as the Intel 80286.

It is another object of the present invention to provide preferred methods designed for use with computers such as the IBM PC/AT which utilize the Intel 80286 which will optimize the operation of such computers in a multi-tasking, mode switching environment.

These and other objects of the invention, which will become more apparent as the invention is described more fully below, are obtained by providing an improved method of switching modes to execute a mixture of programs in a multi-mode microprocessor. In preferred embodiments of the present invention designed for use with microprocessors which must be reset to switch from some modes to others, mode switching is preferably performed by activating the reset hardware in as efficient a manner as possible. After the microprocessor is reset, improved boot-up software will determine whether the reset was triggered under software control (indicating a mode switching reset), in which case the normal initialization routines of the boot-up software are bypassed. During reset procedures, special provisions are preferably made to handle direct memory access and interrupts.

Preferred embodiments of the present invention preferably include at least portions of the operating system, including device drivers and interrupt service routines, that can be executed in all modes. For microprocessors wherein a common method of memory addressing is not used in all modes, alternate preferred embodiments of the present invention provide an improved method of selecting the base addresses for the operating system subroutines to enable multi-mode addressing. A preferred embodiment designed for use with the Intel 80286 and microprocessors with similar architecture includes the steps of selecting real memory segment base values that are in a format compatible with the protected mode mapping architecture and configuring the protected mode descriptor tables to produce a resulting base address identical to that obtained in real mode. Device drivers, interrupt service routines, and portions of the operating system that are frequently used in both modes are thus placed in real memory at locations selected in this manner.

Preferred embodiments for use with the Intel 80286 microprocessor also preferably include an operating system subroutine that will examine the address of the I/O location designated by a device driver and produce a 32-bit (segment:offset) pointer which will address the desired memory location in the current mode. When the system is in protected mode, the subroutine will program the GDT or LDT to achieve this result. When the system is in real mode, the subroutine will preferably generate real mode addresses using internal diagnostic instructions to cause the 80286 to address memory locations above 1 megabyte although in real mode. Alternately, information intended for storage at memory addresses above 1 megabyte can be temporarily stored in a buffer at addresses below 1 megabyte while the system is in real mode, and then transferred to the desired memory location above 1 megabyte when the system switches to protected mode.

Preferred embodiments for use with the Intel 80286 microprocessor also preferably include steps which are designed to eliminate compatibility problems between 8086 programs and the 80286. Depending upon the nature of the system, software modifications or the addition of an auxiliary hardware element to disable the effect of address line A20 are provided.

Preferred embodiments include means for handling existing real mode programs which store the address of their own interrupt handling routines into the hardware interrupt vector table. Special code enables the DOS to mode switch to real mode as required by such interrupt handler routines and switch back to protected mode to continue execution of the interrupted program.

Alternate preferred embodiments designed for use with programs that hook interrupt vectors include means for eliminating the problems caused by such programs in a multi-tasking environment. The DOS includes a dispatcher that monitors the hardware vector table to detect hooks by application programs and transfers control to the interrupt handler routines of such application programs at appropriate times. In one preferred embodiment, interrupt vectors are moved to new locations within the hardware interrupt table to facilitate operation of the dispatcher.

Alternate preferred embodiments may also include techniques for enlarging the amount of memory available to programs in the real mode. First, 64K of the DOS is positioned in memory at location 1 megabyte. Additionally, portions of the DOS which are comparatively large and infrequently used or relatively slow are placed in memory above 1 megabyte and used only in protected mode. The mode switching techniques of the present invention enable such DOS code to be accessed by real mode programs by switching into and out of protected mode as necessary to perform the requested operation.

Auxiliary protection hardware may also be provided in alternate preferred embodiments to provide enhanced protection when running real mode programs. I/O masking hardware can be provided to check each I/O operation attempted by the CPU against a list of valid I/O addresses. Memory protection hardware can also be provided to check each memory operation attempted by the CPU against a list of authorized addresses stored in an auxiliary RAM.

BRIEF DESCRIPTION OF THE DRAWINGS

FIG. 1 is a schematic representation of the real mode memory address procedure of an 80286 microprocessor.

FIG. 2 is a schematic representation of the segment selector format for an 80286 microprocessor in protected mode.

FIG. 17 is a schematic diagram illustrating the operation of a second preferred embodiment of an improved interrupt handler method of the present invention.

BEST MODE FOR CARRYING OUT THE INVENTION

Figure 3:
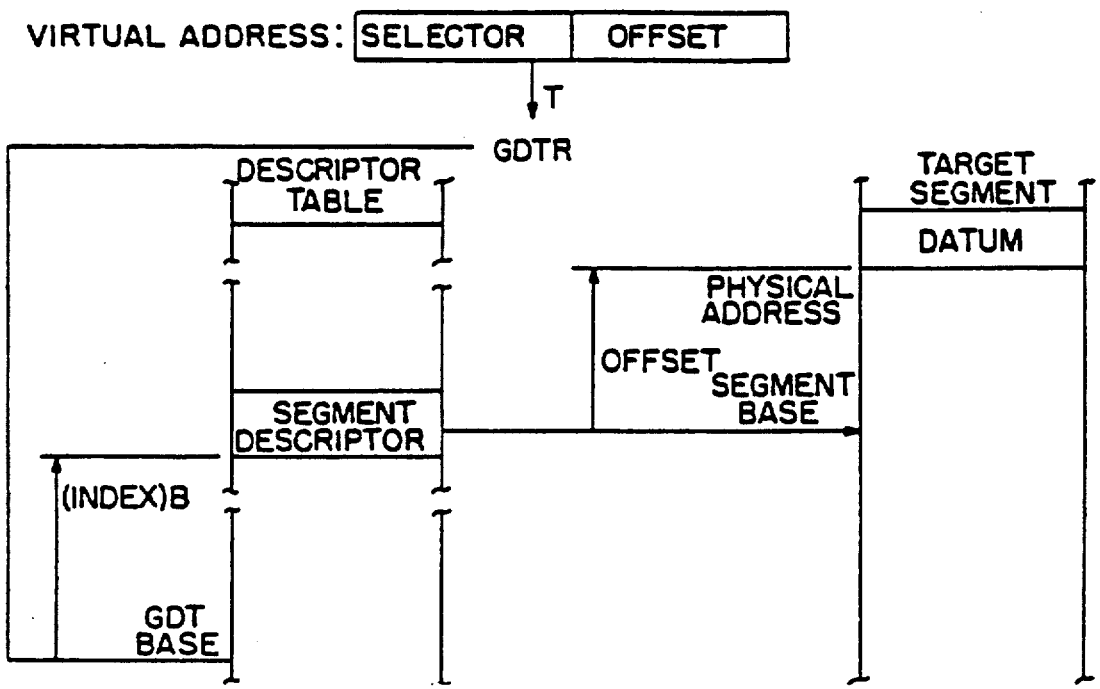
FIG. 3 is a schematic representation of the method in which a virtual address in an 80286 microprocessor is translated to a physical address.

The present invention is perhaps best understood with reference to preferred embodiments designed for implementation with the Intel 80286 microprocessor. The present invention enables a mixture of real mode and protected mode programs to be run on the 80286 without loss of performance. Programs written in both modes are loaded into an 80286 system and executed as required using an improved multi-tasking operating system that includes means for switching modes of the 80286 as required by the currently executing program. Additional means are preferably provided to maximize the performance of the system. The initial operating steps of the present invention will be described first, followed by the mode switching techniques and steps deigned to increase efficiency of operation and eliminate compatibility problems. Finally, alternate preferred embodiments utilizing additional hardware to provide enhanced protection when running real mode programs are described.

Application programs that will be run on a system incorporating an 80286 are typically loaded into the main memory of the system from an auxiliary storage device, such as a magnetic disk. Each program written for the 80286 includes a indicator or "flag" that designates whether the program is designed to run in real mode or protected mode. As each program is loaded into the main memory, the operating system will preferably determine whether it is a real or or protected mode program and store he program accordingly within the main memory. For reasons which will become apparent as the remainder of the best mode is described below, real mode programs are preferably stored at memory addresses below 1 megabyte and protected mode programs are preferably stored at memory locations above 1 megabyte when using the methods of the present invention.

When each program is loaded into the main memory of the system, a record is created which includes information such as the name, size, memory location, and type (real or protected) of the program. At the time of execution, an operating system in accordance with the present invention will check the program type and the current mode of the microprocessor, and will generate a mode switch, if required, in the manner described below.

Mode Switching

When the 80286 is first activated, it is initialized in real mode. Switching from real mode to protected mode is accomplished by means of an instruction provided by the 80286 for this purpose. In the present invention, switching from protected mode to real mode is accomplished as follows:

First, the microprocessor is reset. Because the 80286 provides no method to switch from protected mode to real mode, it is necessary to reset the microprocessor in order to return to real mode from protected mode. The actual reset signal is generated by hardware elements designed for that purpose. Activation of the reset signal can be accomplished by a variety of techniques. For example, the reset signal can be generated using an I/O port to signal the reset hardware and cause a CPU reset to be generated. Although such a technique is the standard method contemplated to accomplish a reset in most 80286 systems, it has been found that in some computers incorporating the 80206, such as the IBM PC/AT, use of such a technique is relatively slow. Consequently, when using the method of the present invention in conjunction with an IBM PC/AT computer, it is preferred that the reset be accomplished by generating a "triple fault" in protected mode. A triple fault is generated by intentionally committing three separate protection violations in protected mode. An auxiliary monitoring circuit, such as is found on the IBM PC/AT, can be provided to monitor the 80286, detect a triple fault condition, and cause the reset hardware to be activated upon occurrence of the triple fault condition. Under such conditions, a reset of the CPU occurs several hundred microseconds faster than a reset generated using the I/O port.

The reset signal is typically fed to the system clock generation chip so that the signal is properly synchronized with the system clock. This software-commanded reset signal is normally not sent to the "general system reset" line or to other chips, such as an interrupt controller, a device controller chip, or the80287 co-processor (if present).

After the 80286 is reset, it begins to execute at a special chip reset address. This address usually corresponds to ROM which contains the boot-up software. Thus, when the microprocessor is reset, it will normally go directly to its initialization or boot-up routines. When switching from protected mode back to real mode, however, it is not necessary or desirable to reinitialize the entire microprocessor. Consequently, the code of the boot-up software is modified so that before it proceeds with the normal boot-up process, it checks to see if the reset was explicitly triggered under software control (indicating that mode switching is taking place) or was triggered by an external hardware-related event, such as power-up. Various methods can be employed to make this determination. The operating system can place a special value or pattern of special values in volatile RAM. If the boot-up software detects such a value or pattern of values, it will know that the processor was previously activated and mode switching is taking place. If non-volatile RAM exists, a location could be reserved for a "mode switch reset" flag which can be queried by the boot-up software to determine whether mode switching is taking place. A hardware latch which is set by a hardware-generated reset and cleared by a software-generated reset could be used. This latch could be interrogated by the boot-up software, by means of an I/O port, for example, and is preferred in many systems as it provides a fail-safe means of detecting mode-switching resets.

While the 80286 is being reset, the remainder of the system can continue to function. RAM locations will not be damaged by the process. Because the rest of the system can continue to operate, two precautions may be necessary during reset. First, it may be necessary to make sure that no direct memory access operations are in progress, depending on the design of the direct memory access facility, because the 80286 may fail to properly perform bus grant operations while being reset.

The second precaution that must be taken during resetting of the 80286 relates to interrupt handling. It is necessary that interrupts be disabled during the reset process and that no interrupt be lost. If the system uses edge-triggered interrupts, there must be hardware to remember the incoming interrupt. In the preferred methods described herein, a programmable interrupt controller, such as the Intel 8259, is preferably used in the system. In such a system, maskable interrupts are held off during mode switching by programming the 8259 mask register to hold off interrupts. It is also believed that the same result can be achieved using the CLI (Clear Interrupt Flag) instruction of the 80286 to disable interrupts.

Mode Switching Efficiency

For mode switching to be practical in an operating system environment, it must not slow the general operation of the system. It is therefore desirable that the operating system be written so that it can execute in both modes. If the operating system were written so that it could only execute in one mode, it would force programs running in the other mode to mode switch to and from the other mode during a system call. For this reason, all or most of the operating system in preferred embodiments of the present invention is written in such a fashion that it can be executed in both real mode and protected mode. Additionally, because mode switching to take I/O interrupts would degrade the performance of the system, interrupt service routines should be written, whenever possible, to be runable in either mode. Device drivers are also preferably capable of running in both modes as a mode switch may occur between the time a task requests an I/O operation utilizing a device driver and the time that the device driver routine runs on the processor.

The architecture of the 80286 creates special problems when attempting to design an operating system which will execute in real and protected modes because each mode uses a different method of memory addressing. Consequently, a given memory address will normally designate one location in the physical memory of an 80286 system in real mode and another location in the physical memory of an 80286 system in protected mode. Thus, an operating system would normally need to maintain two addresses (real and protected) for each memory object to enable operation in both modes. Such a requirement burdens the operating system and creates problems with procedure calls which have memory addresses built into them. The present invention solves this problem by providing an improved method of locating the operating system routines such that they can be commonly addressed in real and protected mode. An explanation of this method is best prefaced by an explanation of the memory addressing methods employed in the real mode and the protected mode.

In the real mode, the 80286 emulates the memory addressing methods of an 8086 processor. All memory addressing is performed in terms of physical or "real" addresses. An address is specified by a 32-bit pointer containing two components: (1) a segment selector comprising a 16-bit quantity which specifies the starting address of a segment; and (2) an effective address offset that determines the displacement, in bytes, of a particular location within a segment. These two values are commonly referred to in a (segment:offset) format. The segment selector and offset are combined as illustrated in FIG. 1 to produce a 20-bit physical address. The base address of the segment is determined by interpreting the 16-bit segment selector value as a 20-bit value having zeros in the four least significant bits. The 16-bit offset value is then added to this 20-bit segment base to produce a 20-bit value designating the physical address. (Because the 80286 in real mode is emulating the 8086, each 16-bit physical value designating a segment address is actually stored in a 24-bit register, with the four most significant bits set at 0 and effectively transparent to the user in real mode. This characteristic of real mode address is important in preferred embodiments utilizing internal diagnostics to handle device drivers, as discussed below.)

In the protected mode, a 32-bit pointer is also used to specify memory addresses. A memory management scheme interposes a mapping operation between the logical address as specified by the 32-bit pointer and the actual physical address specified by that pointer, making the logical addresses independent of physical memory. Mapping is accomplished by use of a number of memory resident descriptor tables that govern the interpretation of virtual addresses. Thus, the segment selector component of a 32-bit virtual address specifies a particular location within a descriptor table rather than a location in the physical memory. Descriptor tables are made up of 8-byte entries called "descriptors." An index field within the segment selector points to a segment descriptor within a descriptor table. The segment descriptor includes a 24-bit value which identifies a segment base location in the physical address space of the microprocessor.

The format of a protected mode segment selector is illustrated in FIG. 2. The two least significant bits of the segment selector are permission bits used in the protection scheme of the 80286. Bit 2 of the segment selector is a table indicator bit which defines whether the physical memory location will be selected from a Global Descriptor Table (GDT), or a Local Descriptor Table (LDT). When the table indicator bit is set at zero, the Global Descriptor Table is selected. The GDT contains base memory locations for global address space, which is used for system-wide procedures and data, including the operating system. When the table indicator bit is set at 1, the segment selector selects a Local Descriptor Table (LDT), which selects local address space that is separately masked for each task.

FIG. 3 illustrates schematically the manner in which the 32-bit virtual address is used to define a location in the physical memory of the microprocessor. The table indicator bit of the segment selector dictates whether the GDT or the current LDT will be used and the corresponding GDTR or LDTR provides the base address for the appropriate table. The index field of the segment selector, comprising the thirteen most significant bits, is then used to select the appropriate segment descriptor from the table. The processor multiplies the index value by eight (as there are eight bytes per descriptor) in order to access the appropriate segment descriptor.

Figure 4:
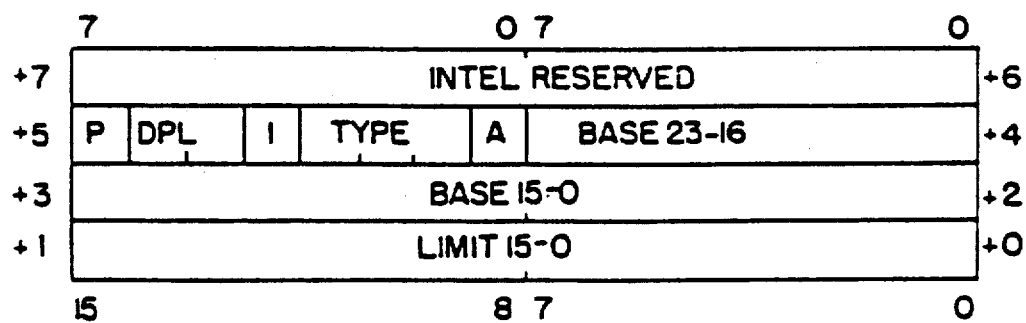
FIG. 4 is a schematic representation of the format of a segment descriptor from a descriptor table in the protected mode of the 80286 microprocessor.

As illustrated in FIG. 4, the contents of the segment descriptor include a 24-bit value which designates the base address of the target segment (the segment in the physical memory where the address is located). The 16-bit offset value from the 32-bit virtual address is then added to this segment base address to produce the physical memory address.

Figure 5:
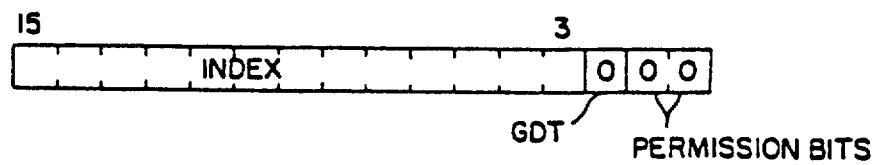
FIG. 5 is a schematic representation of the format of a protected mode segment selector component designating global address space.

In the method of the present invention, all or most of the operating system is stored in real memory such that the addresses of the entry points for the operating system routines can be designated by a common (segment:offset) value in both real and protected mode. FIG. 5 illustrates the format for a protected mode segment selector component designating global address space. It is preferred that the operating system segments be located in the address space such that segment selectors are coded in formats which will select the global descriptor table, i.e., where bit 2 of the segment selector is 0. Use of the LDT is possible but is not preferred due to the extra overhead of manipulating LDTs. In the example illustrated in FIG. 5, the two least significant bits have been set at 0. It is preferred that these bits be set at 0, indicating a privilege level of 0. Although the method of the present invention could be used with the two least significant bits of the segment selector set at non-zero values, such values are less preferred because of their resultant effect on the 80286 protection scheme when operating in protected mode.

Figure 6:
FIG. 6 is a schematic representation of the real mode interpretation of the segment selector of FIG. 5.

FIG. 6 illustrates how a segment selector of the format illustrated in FIG. 5 will be interpreted in real mode. A 20-bit segment base defining a base address in real memory includes the segment index value in bits 7-19 and 0's in the seven least significant bits.

Thus, to obtain the same base address in real memory using either real mode addressing or protected mode addressing, it is necessary to store a value equivalent to the real-mode 20-bit segment base value in the 24-bit base value of the appropriate segment descriptor in the Global Descriptor Table.

Figure 7:
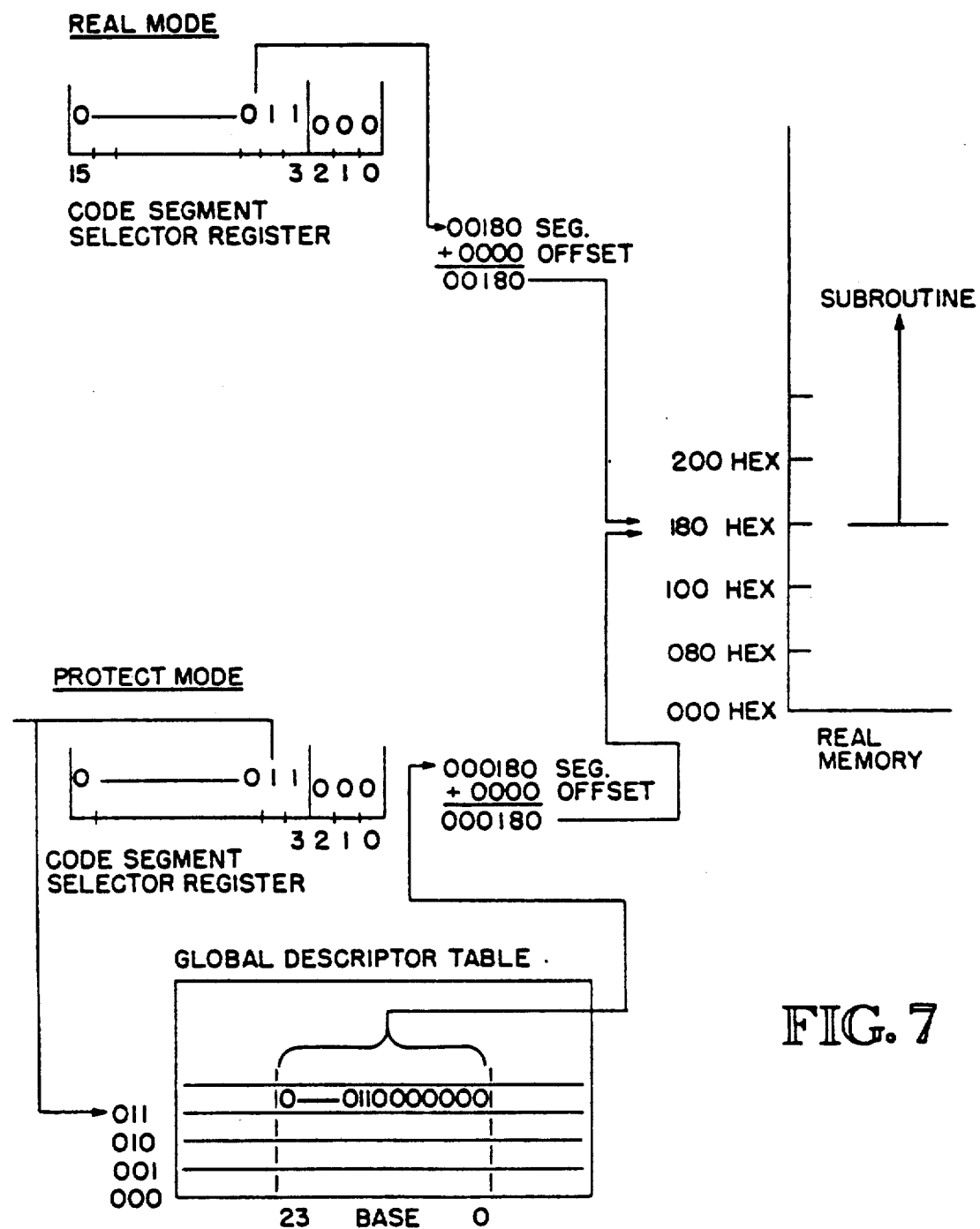
FIG. 7 is a schematic representation of the method of the present invention for obtaining common physical memory addresses in real and protected mode from a given (segment:offset).

An example of this method of selecting memory locations which can be made accessible in both real mode and protected mode is illustrated in FIG. 7. First, a real mode segment selector in a format compatible with the protected mode is selected. In the example shown, the binary value 11000 is selected. For the purposes of this example, an offset value of 0 is used. In real mode, the segment selector will be converted to a 20-bit base selector having a binary value of 110000000, or 180 HEX. The offset value of 0 will be added to this segment base to produce a real memory address of 180 HEX.

In protected mode, the segment selector value of 11000 will designate the two least significant bits as 0, the table bit as 0, and the index value as 011. This index value will select the descriptor corresponding to the value 011 in the GDT. Using the method of the present invention, the 24-bit base value contained within that descriptor will be set at 0110000000, the same value obtained for the segment base in the real mode. In protected mode, this 24-bit base value will then be added to the offset to obtain the memory address 180 HEX in real memory. As illustrated in FIG. 7, a subroutine of the operating system, for example, is stored with its entry point address at 180 HEX and can be addressed in either mode.

By selecting (segment:offset) values using the method described above and storing commonly addressable subroutines with the corresponding entry point addresses, the operating system, device drivers, and interrupt service routines can be stored using the same technique so that they can be entered in either mode.

An additional consideration for device drivers is high memory addressability. A protected mode program may request I/O to an address above one megabyte. Before the requested I/O operation actually takes place, the processor may be switched to real mode. If the device driver routine is running in real mode at the time the request is to be serviced, it will be unable to address the I/O location. To eliminate this problem, operating systems used as part of the present invention preferably include a subroutine which will examine the address of the I/O locations and produce a (segment:offset) pair which will address the desired memory location in the current execution mode. If the system is in the protected mode, this is straight-forward programming of the GDT or LDT. For real mode addresses below 1 megabyte, programming is similarly straightforward. For real mode addresses above 1 megabyte, however, a special technique is preferably used. Because the 80286 is emulating the 8086 and its 20-bit physical memory address format, it is possible to use internal diagnostic instructions to create a 24-bit physical address in real mode. Such instructions enable the operating system to insert values into four high order bits which are normally set at 0 and transparent to system programs in real mode. Information regarding the use and operation of such instructions is typically available from the manufacturer of the microprocessor. For example, Intel Corporation provides such information relating to the 80286. Once a 24-bit segment value is created using this method, a device driver can address memory above 1 megabyte in real mode. As an alternative to forced memory addressing above 1 megabyte in real mode, it is possible to create a buffer in memory locations below 1 megabyte to temporarily store the data until the system switches to protected mode. When the system switches to protected mode, the contents of the buffer can be transferred to addresses above 1 megabyte.

Compatibility Problems

1. Megabyte Wrap

Preferred methods in accordance with the present invention preferably include steps designed to eliminate compatibility problems between existing MS-DOS programs written for the 8086 and the 80286 operating in real mode. Such problems arise from the fact that the 80286, in real mode, does not emulate the 8086-8088 chip family completely accurately. One such compatibility problem is known as the "1 megabyte wrap" problem. Because the 8086 cannot address memory above 1 megabyte, attempts to address memory locations above 1 megabyte resulted in any values that would be stored in bits above bit-19 being ignored. Consequently, an attempt to address location 1111111111111111111+010 would cause the address to be "wrapped" around to low memory location 01. Some programs written for the 8086 rely on this feature to run properly. Unfortunately, memory locations extend above 1 megabyte in the real mode of the 80286 and are not wrapped to low memory locations. Consequently, programs including those written in MicroSoft PASCAL and programs which use the "Call 5" feature of MS-DOS will fail on the standard 80286 system. Operating systems designed in accordance with the present invention preferably provide two alternate solutions to this problem.

For systems which may be configured with memory above 1 megabyte, an auxiliary hardware element is preferably provided to disable the effect of address line A20. Address line A20 activates the carry bit in calculations, and its disablement will thus cause wrapping to occur. This hardware can be activate and deactivated under software command. The operating system will activate this hardware, as necessary, before it executes real mode programs. In some computers, such as the IBM PC/AT, disabling the A20 line is a relatively slow step which preferably is done once when the system is initially booted up. It is not necessary to reprogram the A20 hardware during mode switching for this case.

For systems with memory extending beyond 1 megabyte, the problem is preferably solved by placing special instructions at the lower memory locations above 1 megabyte which will point to the desired low memory location. For example, no PASCAL programs are loaded into memory below 64K, and a special instruction is placed in the lower memory locations above 1 megabyte—for example, address 100000h or 100010h. A "Call 5" instruction, for example, in a task's PDB is then modified to jump to high-memory address, which in turn transfers control to the DOS. A20 can now be always left activated, regardless of the mode of the program being run.

2. Interrupts a. Real Mode Programs with Interrupt Handler Routines

Some existing real mode programs make use of hardware interrupts by storing the address of their own interrupt handler routine in the interrupt vector table. This means that the interrupt handler routines in these programs may be called by the interrupt vector when the 80286 is in the protected mode. Disk-operating systems (DOS) in accordance with the present invention preferably handle these situations by causing the interrupt vector to point to a special DOS code that causes the 80286 to switch to real mode, and then transferring control to the proper address in the real mode program. An additional return address is placed on the stack so that when interrupt servicing is complete, the program returns control to the DOS, which mode switches to protected mode, and then returns to the interrupted code.

There are two techniques which may be used to perform this interrupt interception. The first is to place this special code in the DOS "setvector" command handler. Some programs use this DOS function to change the contents of the interrupt vectors.

The second technique relates to programs which write directly into the interrupt vectors. Before dispatching a real mode program, the DOS records the status of the interrupt vectors. When the 80286 is about to be reassigned, the DOS reexamines the vectors and looks for any changes. Any detected changes represent vector edits and are handled by editing the interrupt vector to point to special DOS code as described above.

b. Alternate Preferred Embodiments for Hooking Programs

Many applications "hook" interrupt vectors by reading and saving the previous contents. When they receive control from the interrupt vector, they may "pass it on" by jumping to the previous address value. This technique works well so long as none of the programs involved ever terminate. If one of the programs in such an interrupt chain were to terminate, the program upstream of it would continue to transfer control at interrupt time to the memory address that used to designate the terminated program, thereby causing system failure. This phenomenon is illustrated in FIGS. 8 through 12.

Figure 8:
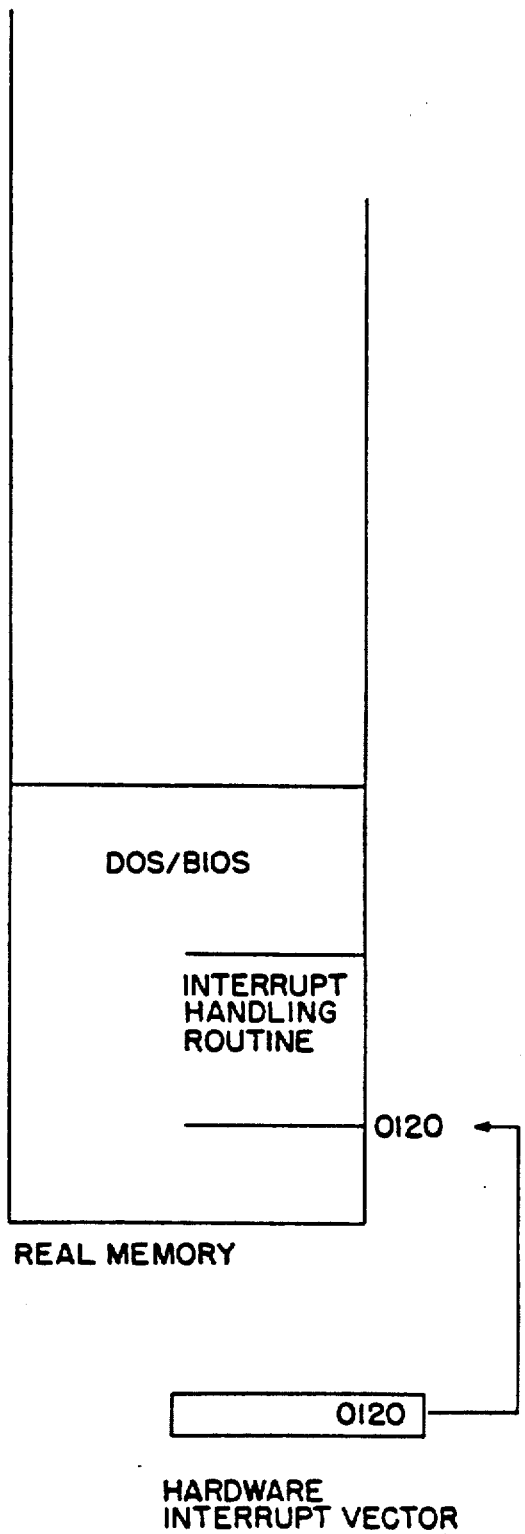
FIG. 8 is a schematic diagram illustrating the method by which an existing operating system handles interrupts with no application programs present.

FIG. 8 illustrates how an existing operating system DOS services an interrupt when no applications programs have an interest in the interrupt. In this case, the DOS has put the address (0120) of the entry point of its interrupt handler routine into the interrupt vector table. When the interrupt corresponding to the location in the interrupt vector table illustrated in FIG. 8 occurs, the 80286 will transfer control to the DOS's corresponding interrupt handler routine. When the interrupt handler routine is finished with its work, it executes an "Interrupt Return (IRET)" instruction which causes the 80286 to return to the previous execution stream.

Figure 9:
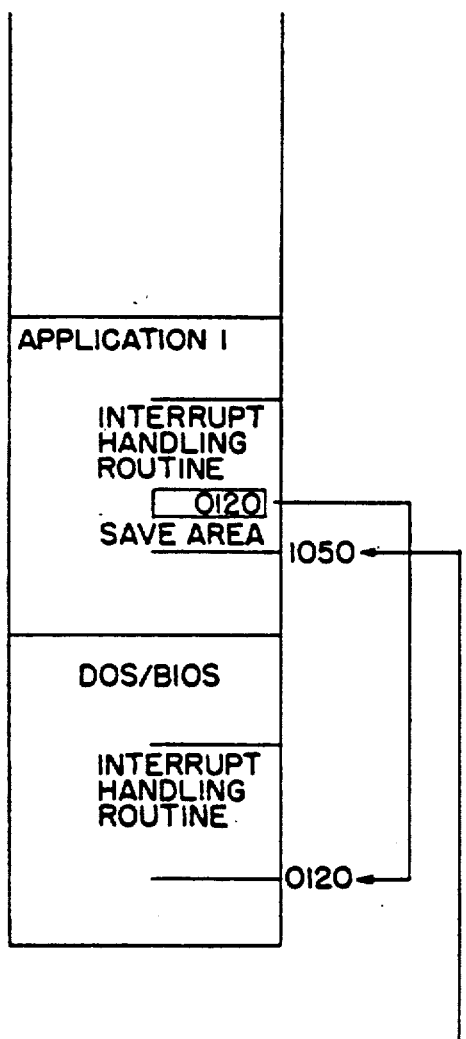
FIG. 9 is a schematic diagram illustrating the method by which an existing operating system handles an interrupt with one application program including an interrupt handler routine present.

FIG. 9 illustrates how a single application (Application 1) typically intercepts hardware interrupts in an existing DOS environment. The DOS has installed the address of its interrupt handler routine (0120) in the interrupt vector table, as illustrated in FIG. 8 and discussed above. Application 1 reads the current contents of the interrupt vector (0120) and saves that value in some memory location within its address space. It then installs the address of its own interrupt handler routine (1050) in the hardware vector table.

When an interrupt occurs, the 80286 will transfer control to the application's interrupt handler routine instead of the DOS interrupt handler routine. The application then typically examines the cause of the interrupt and decides either to process the interrupt itself and issue an IRET instruction to return control to the previous execution stream, or transfer control to the DOS interrupt handler (whose address it has saved). In the former case, the DOS interrupt handler is never executed.

Figure 10:
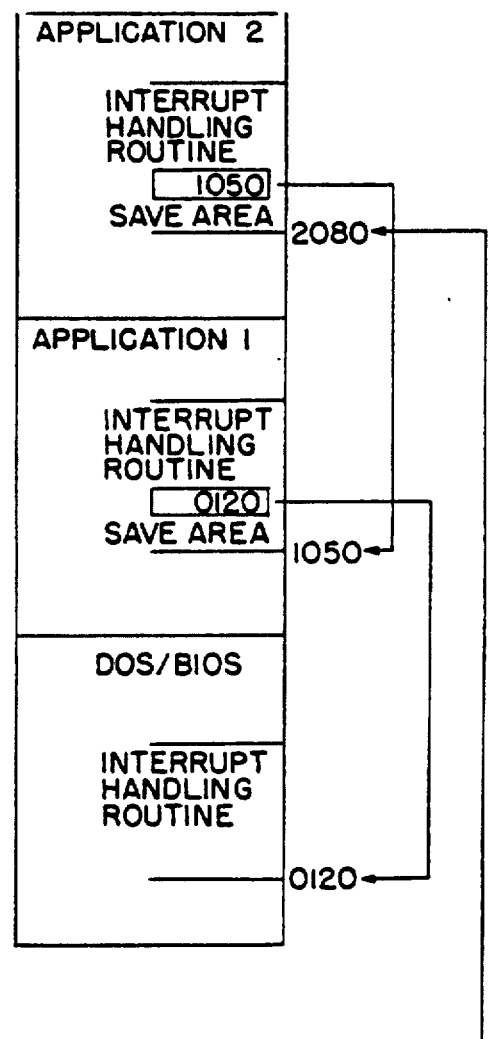
FIG. 10 is a schematic diagram illustrating the method by which an existing operating system handles an interrupt when two application programs including interrupt handler routines are present.

FIG. 10 illustrates what happens when a second application (Application 2) is added to the scenario illustrated in FIG. 9 and describe above. Application 2 has read the hardware interrupt vector table and saved the address of Application 1's interrupt handler routine (1050) in its address space. It has then installed the address of its own handler routine (2080) in the vector table.

In this scenario, when an interrupt occurs, Application 2's interrupt handler routine is entered first. It may either process the interrupt or pass control to the interrupt handler routine of Application 1. If control goes to Application 1's interrupt handler routine, it may either process the interrupt or pass control to the DOS interrupt handler routine.

Note the priority scheme developed by this chain. The last application entering the system has right of first refusal on the interrupt and the DOS is the handler of last resort, handling the interrupt only if no applications want it. This technique is commonly used to allow applications to filter keystrokes from a terminal and recognize certain special "control" keycodes while passing unrecognized codes down to the next handler in the chain.

Figure 11:
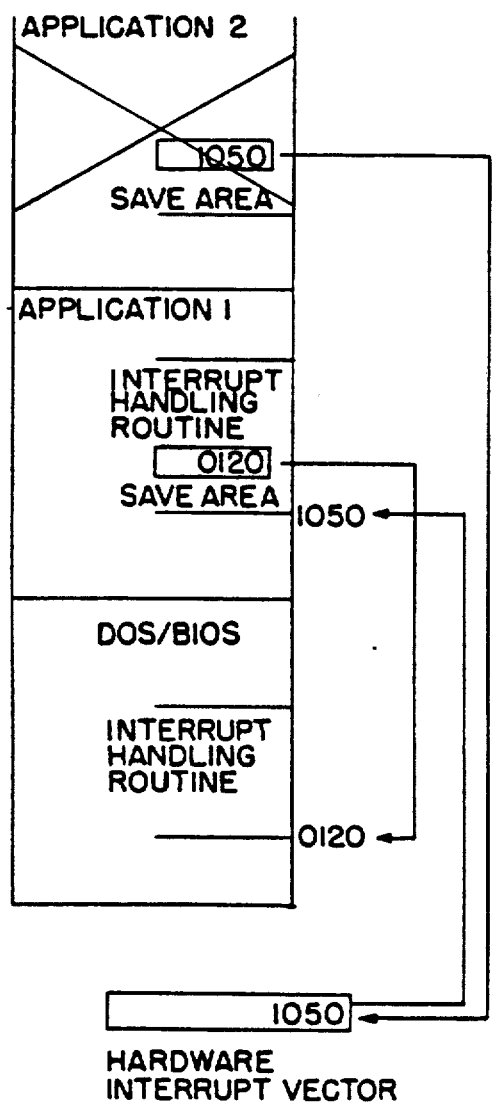
FIG. 11 illustrates schematically the effect of termination of the second application program in a chain of two application programs including interrupt handler routines.

Programs which use these techniques of chaining interrupt vectors typically restore the address of the handler they replaced when they exit. FIG. 11 illustrates Application 2 terminating, and before doing so, it has restored the value in the interrupt vector table to that to Application 1's handler routine (1050).

Figure 12:
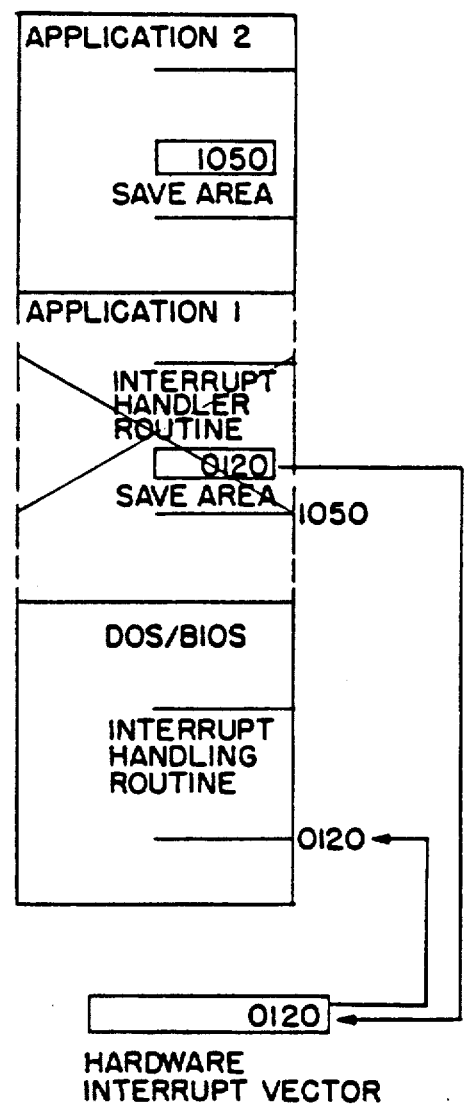
FIG. 12 illustrates schematically the effect of termination of the first application program in a chain of two application programs including interrupt handler routines.

FIG. 12 illustrates the effect of Application 1 terminating before Application 2. Application 1 will restore the address of the handler it saved, i.e., that of the DOS's handler. As soon as this happens, Application 2 (which is still running) is incorrectly cut out of the chain.

This incorrect behavior is a direct result of the fact that a multi-tasking system is running applications designed for a single-tasking system. Such applications assume that there can only be one program in the system (themselves) which can terminate. This assumption is false in a multi-tasking system.

Note that there is an even more serious scenario not illustrated. Following the description above, if Application 2 now terminates, it will restore the interrupt vector table to the value it saved, i.e., 1050. This value designates the former address of the interrupt handler routine of Application 1, which is no longer at such former address. The existence of a vector in the hardware vector table which points to a random place in memory will typically cause the system to crash before much time elapses.

Preferred embodiments of the present invention preferably include a novel interrupt handling method which solves the problems described above. Each hardware interrupt vector used by the DOS is set up by the DOS to point to a special routine in the DOS called the "dispatcher." The dispatcher maintains a client list of all the interrupt handler routines interested in each interrupt and transfers control to such handlers at appropriate times.

Figure 13:
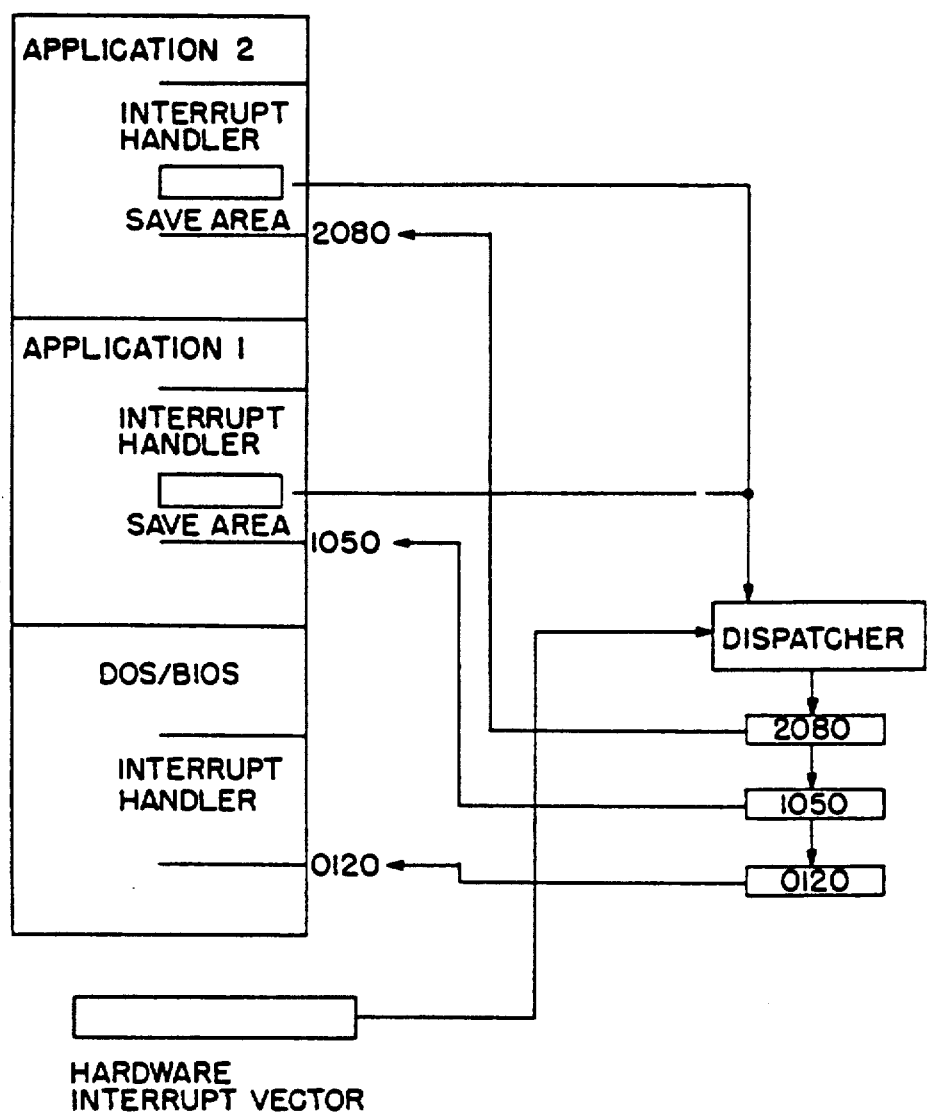
FIG. 13 illustrates schematically the improved method of the present invention for handling vector interrupts.

In the preferred embodiment of the interrupt handling method that is illustrated in FIG. 13, each interrupt vector is set to point at a corresponding entry point in the dispatcher routine. FIG. 13 illustrates, for example, that interrupt vector number 8 has been set to point to address 190 in the dispatcher. The dispatcher maintains a client list corresponding to each interrupt vector. Initially, the client list contains just one entry: the address of the default handler in the DOS (0120 in FIG. 13).

The dispatcher monitors the contents of the hardware interrupt vector to determine when an application program has replaced the contents of the hardware interrupt vector with the address of its own interrupt handler routine. The contents of an interrupt vector are checked each time that interrupt occurs and each time that control is transferred to the DOS. When a change is detected, the DOS will read the new contents of the interrupt vector into the top of its client list and reset the interrupt vector to point to the dispatcher. For example, when Application 1 (illustrated in FIG. 13) begins execution, it saves the address from the interrupt vector (190) and places its own interrupt handler routine address (1050) in the interrupt vector. At the next dispatch or interrupt for this vector, the DOS will notice that the application has modified the hardware interrupt vector. It will reset the hardware interrupt vector to 190 to point to the dispatcher and will add the address of Application 1's handler (1050) to the dispatcher list for this interrupt vector.

When Application 2 begins, the same procedure occurs. The interrupt vector is restored to point to the dispatcher, and the dispatcher's client list now contains three addresses: 0120 (the address of the DOS interrupt handler routine); 1050 (the address of the interrupt handler routine for Application 1); and 2080 (the address for the interrupt handler routine for Application 2).

Figure 16:
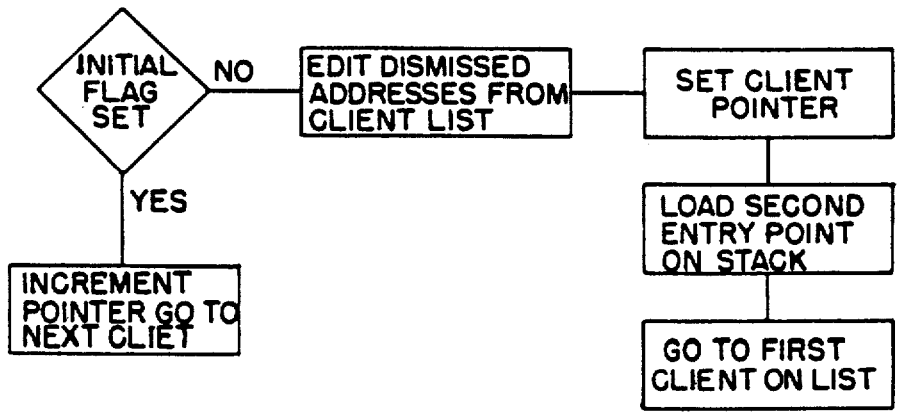
FIG. 16 is a flow chart illustrating the logic of the dispatcher in a first preferred embodiment of an improved interrupt handler method of the present invention.

When an interrupt occurs, the dispatcher calls each interrupt handler routine in reverse order (i.e., Application 2, Application 1, and DOS) until one of them issues an IRET instruction, indicating it has processed the interrupt. The processing of an interrupt using the method of FIG. 13 is illustrated in the flow chart of FIG. 16. When control is transferred to entry point 0190, a check is made of an initial flag within the dispatcher. If the initial flag is not set, the dispatcher will set the initial flag, set a client pointer, place the address of a second entry point of the dispatcher on the stack, and transfer control to the first address on the client list for the interrupt being serviced. In the environment illustrated in FIG. 13, control would be transferred to address 2080, the address of Application 2's interrupt handler routine. Application 2 will either process the interrupt and issue an IRET, or return control to address 0190, which it previously saved. If control returns to address 0190, the dispatcher will check the initial flag. Because the initial flag is now set, the dispatcher will increment the client pointer and transfer control to the second address on the client list. In the environment illustrated in FIG. 13, control will be transferred to address 1050, the address of Application 1's interrupt handler routine. Application 1 will either service the interrupt and return control to address 0190, or issue an IRET. As illustrated in FIG. 16, when an interrupt handler issues an IRET, control will be transferred to the second entry point in the dispatcher because that address was previously placed on top of the stack. The dispatcher will then clear the initial flag and issue another IRET to the system, causing control to return to the interrupted execution stream.

Figure 14:
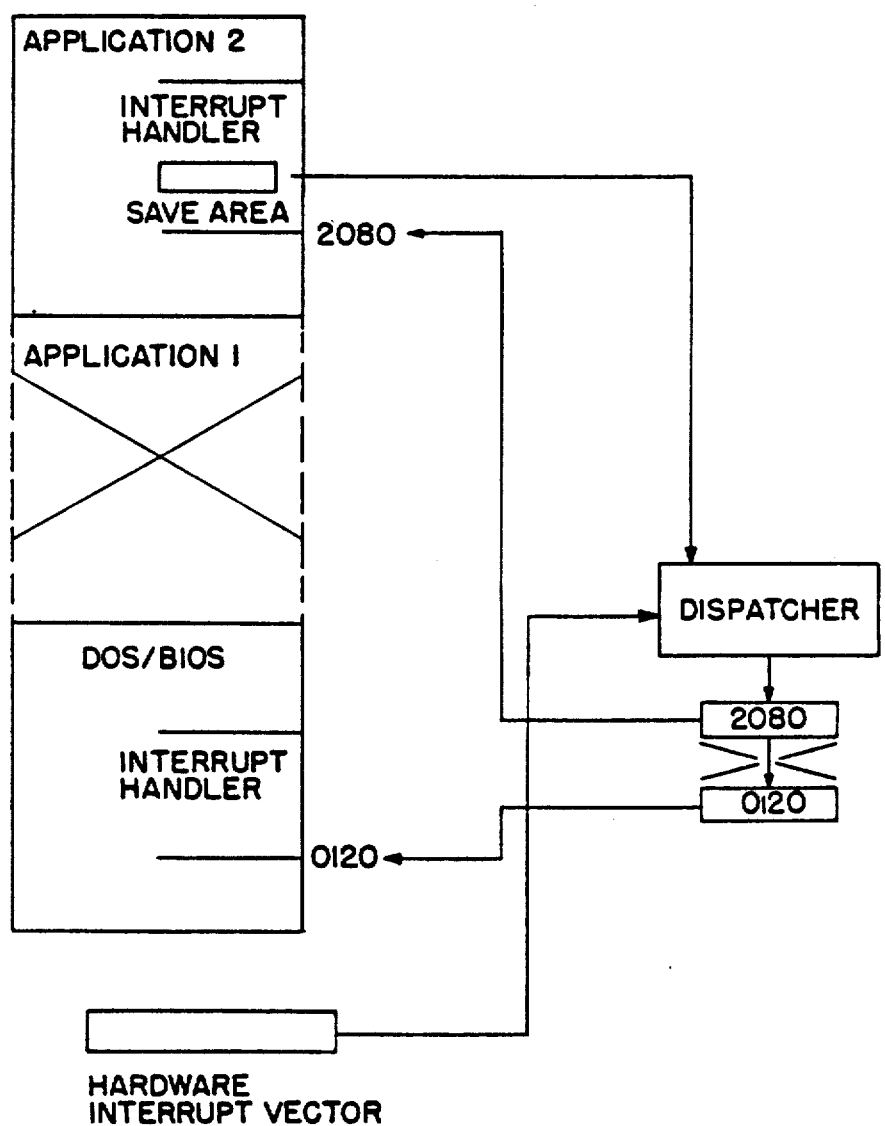
FIG. 14 is a schematic illustration of the method of FIG. 13, illustrating the operation of the dispatcher when the first application program of a two cation chain terminates.
Figure 15:
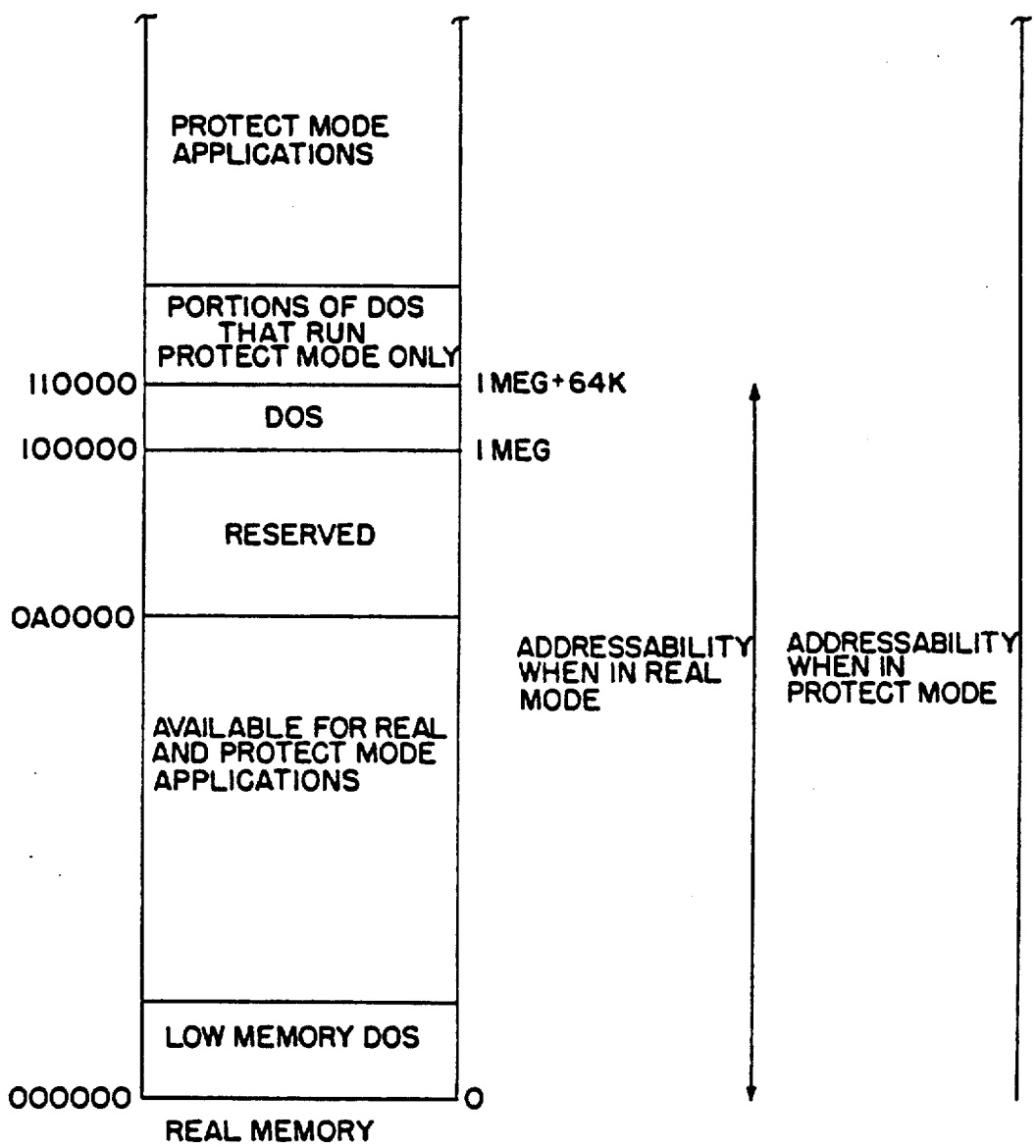
FIG. 15 illustrates schematically the improved method of locating an operating system in memory in accordance with the present invention.

Using the method of the present invention and as illustrated in FIG. 14, when any application terminates and sets the interrupt vector back to what it thinks is the address of the previous interrupt handler routine, the DOS will detect its departure from the system and and remove the address of the terminating application's interrupt handler from the dispatcher's client list.

Alternate embodiments of the interrupt handling routine of the present invention are also possible. In the preferred embodiment illustrated in FIG. 17, the interrupt vectors have been moved to an alternate location within the Interrupt Descriptor Table of the 80286. For example, the hardware interrupt formerly handled by interrupt vector 8 is now handled by interrupt vector 108. Vector 108 is set to point to a first entry point within the dispatcher. Application programs written to preempt the value of interrupt vector 8 will continue to read the addresses of their interrupt handlers into interrupt vector 8, although the DOS will actually process the interrupt that the application is attempting to divert using interrupt vector 108. The value of the original interrupt vectors, such as interrupt vector 8, are set to point to a second entry point in the dispatcher. Thus, when an application program enters the system and attempts to edit an interrupt vector, it will place the address of its interrupt handler routine in the original interrupt vector and save the address of the second entry point in the dispatcher. As in the previous embodiment, the dispatcher will check for edits of the interrupt vectors when control is transferred to the DOS and when an interrupt is received. When an edit is detected, the address of the application programs interrupt handler routine is placed on the client list and the interrupt vector is reset to point to the second entry point in the dispatcher.

When a hardware interrupt is received, it is directed to the new interrupt vector, such as interrupt vector 108, and control is switched to the first entry point in the dispatcher. The dispatcher will now know automatically that a true hardware interrupt has occurred. No initial flag is needed in this embodiment. The dispatcher will then initialize its client pointer and transfer control to the first client on the client list for the interrupt being serviced. If the interrupt handler routine for the first client does not service the interrupt, it will return control to a second entry point, causing the dispatcher to increment the client pointer and go to the next client. An IRET instruction issued by any client will return control to the previous execution stream.

3. Alternate Preferred Embodiments

Some machines incorporating the 80286, such as the IBM PC/AT and machines similar to it, are widely used but contain some elements of hardware design which slow mode switching or reduce the amount of memory available to real mode programs. Alternate embodiments of the present invention provide techniques which can be used to improve performance of such machines.

For example, improved performance can be obtained by combining the mode switching techniques of the present invention with certain techniques relating to the location of the operating system in memory, as illustrated in FIG. 14. All 80286 machines are limited to one megabyte of RAM for real mode programs, and most, in fact, limit the amount of RAM usable by programs to 640K. In alternate embodiments of the present invention, the amount of low 640K memory available to real mode programs is maximized by placing up to 64K of the DOS into memory at location 1 megabyte. This part of the DOS can be accessed/executed in both real and protected modes and frees an identical amount of space below 1 megabyte or 640K for use by programs. Further, some elements of the DOS which are comparatively large and infrequently used or relatively slow can be placed in the memory above 1 megabyte and used only in protected mode. For example, file open routines, file rename routines, create directory routines, and delete directory routines can be stored above 1 megabyte without significant loss of performance. Should a real mode program request one of the functions, the DOS will mode switch in the protected mode, perform the requested operation, and switch back before returning to the program.

4. Auxiliary Protection Hardware

The ability to run programs in protected mode greatly contributes to system protection and security. The user/operator of the system can type a command which instructs the DOS to refuse to execute real mode programs and thus provides a fully secure environment. Alternate preferred embodiments of the present invention may provide hardware elements that allow real mode programs to run while still maintaining system protection.

The first such device is referred to herein as "I/O masking hardware." Hardware can be provided which checks each I/O operation attempted by the 80286 against a list of valid I/O addresses. Although the DOS can program a single list to be used, it is preferred that a plurality of lists be maintained by the hardware so that the DOS need only designate an appropriate list to be used at a given time, thereby eliminating the need to determine valid I/O addresses. If the operation is thus permitted, it proceeds. Otherwise, the hardware prevents or disables the operation. The list of valid addresses is usually stored in a RAM device which is programmed by the 80286.

This hardware also allows the DOS to run protected mode programs while allowing them access to "safe" I/O ports (such as private device or the display card's program registers) yet while preventing them access to other I/O ports.

The second type of hardware which may be provided is memory protection hardware. Hardware can be provided which checks each memory operation attempted by the 80286. The DOS makes use of this hardware when running programs in real mode by programming into it the authorized read-only and write-only address ranges for the program. An attempt to access memory outside this location will be flagged by an NMI event and (perhaps) prevented. A typical design for this hardware is small RAM containing permission bits or fields. The high order bits of the access RAM are used to select a bit or field from the high-speed look-up RAM. The states of the bit(s) indicate the legality of the operation. This RAM is programmed by the DOS.

80287 Mode Switching

The hardware requirements to support an 80287 or other multi-mode co-processor are straightforward. Like the 80286, the 80287 has two operational modes, "real" and "protected." It has a software instruction to quickly switch from real to protected mode. There is no corresponding instruction to go from protected to real mode. Thus a hardware mechanism must be provided to allow the simple latch addressed through one of the 80286 ports. Ideally, mode switching of the 80287 should be independent of the 80286 to allow certain optimum uses, as described below.

A simple software implementation is to always switch the 80287 along with the 80286 so that both processors are always in the same mode, real or protected. However, mode switching the 80287 requires that the state of the 80287 and other task specific data be saved. Because all applications do not necessarily use the 80287 co-processor, switching the 80287 with each switch of the 80286 would unnecessarily slow the switching process. Therefore, preferred embodiments of the present invention used with an 80287 preferably set the 80286 as if no 80287 were present in the system, and do not mode switch the 80287 along with the 80286. When an application program attempts to use the 80287, it will initially be unsuccessful. After such an attempt, however, the 80286 is reset to allow access to the 80287. The mode of the 80287 is checked and compared to the mode of the program requesting the 80287, and the 80287 is switched, if necessary. The program is then restarted. When execution of the program requiring the 80287 terminates, the 80286 is reset to indicate that no 80287 is present.

Although the methods and systems of the present invention have been disclosed and described herein primarily with respect to preferred embodiments designed to be used with the 80286 microprocessor and computer systems employing that microprocessor, it is not intended that the present invention be limited to such embodiments. Rather, the present invention is intended to include all legally equivalent embodiments, including those designed for use with microprocessors having architecture similar to the 80286 or presenting problems analogous to those solved by the embodiments disclosed herein.

I claim:

1. A method for accessing a segment in a multi-mode computer having segmented addressing, the computer having a memory, the computer having a segment selector to select the segment, the segment having a base address, the computer having a first mode wherein the base address of the segment is addressed by the segment selector and a second mode wherein the base address of the segment is addressed indirectly by the segment selector which points to a memory location within a mapping system where the base address of the segment is stored, the method allowing the segment to be accessed by the same segment selector value in both the first and second modes, the method comprising the steps of:
    (a) selecting an address that is a multiple of 16 to be the base address of the segment;
    (b) when the computer is in either the first mode or the second mode,
        (1) setting the segment selector to a value so that the segment selector addresses the base address of the segment when the computer is in the first mode;
        (2) storing at a selected memory location within the mapping system the base address of the segment, the memory location being selected so that it is pointed to by the segment selector as set in step (1) when the computer is in the second mode; and
        (3) loading the segment into the memory at the base address; and
    (c) accessing the segment in both the first and second modes using the segment selector.

2. The method of claim 1 wherein the segment contains program routines.

3. The method of claim 1 wherein the segment contains operating system routines.

4. The method of claim 1 wherein the base address in step (a) is set to a value that is greater than or equal to 128.

5. The method of claim 4 wherein the segment contains program routines.

6. The method of claim 4 wherein the segment contains operating system routines.

7. The method of claim 1 wherein the base address in step (a) is set to a value that is a multiple of 128.

8. The method of claim 7 wherein the segment contains program routines.

9. The method of claim 7 wherein the segment contains operating system routines.

10. A method for accessing a segment in a computer, the computer having a memory and the computer based on an Intel 80286 or compatible microprocessor, the microprocessor having segmented addressing and a segment selector to select the segment, the segment having a base address, the microprocessor having a real mode wherein the base address of the segment is addressed by the segment selector and a protected mode wherein the base address of the segment is addressed indirectly by the segment selector which points to a memory location within a descriptor table where the base address of the segment is stored, the method allowing the segment to be accessed by the same segment selector value in both the real and protected modes, the method comprising the steps of:
    (a) selecting an address that is a multiple of 16 to be the base address of the segment;
    (b) when the computer is in either the real mode or the protected mode,
        (1) setting the segment selector to a value so that the segment selector addresses the base address of the segment when the computer is in the real mode;
        (2) storing at a selected memory location within the descriptor table the base address of the segment, the memory location being selected so that it is pointed to by the segment selector as set in step (1) when the computer is in the protected mode; and
        (3) loading the segment into the memory at the base address; and
    (c) accessing the segment in both the real and protected modes using the segment selector.

11. The method of claim 10 wherein the segment contains program routines.

12. The method of claim 10 wherein the segment contains operating system routines.

13. The method of claim 10 wherein the descriptor table is the local descriptor table.

14. The method of claim 13 wherein the segment contains program routines.

15. The method of claim 13 wherein the segment contains operating system routines.

16. The method of claim 10 wherein the descriptor table is a global descriptor table.

17. The method of claim 16 wherein the base address in step (a) is set to a value that is a multiple of 128.

18. The method of claim 17 wherein the segment contains program routines.

19. The method of claim 17 wherein the segment contains operating system routines.

20. The method of claim 16 wherein the segment contains program routines.

21. The method of claim 16 wherein the segment contains operating system routines.

* * * * *